United States Patent [19]

le Comte

[11] Patent Number: 5,096,651
[45] Date of Patent: Mar. 17, 1992

[54] METHOD FOR MANUFACTURING AN OBJECT OF SYNTHETIC RESIN

[76] Inventor: Adolf le Comte, 101 Harbor La. W., New Rochelle, N.Y. 10805

[21] Appl. No.: 527,450

[22] Filed: May 23, 1990

[51] Int. Cl.$^5$ .............................................. B29C 43/20
[52] U.S. Cl. ................................... 264/510; 264/257; 264/258; 264/511; 264/571
[58] Field of Search ............... 264/102, 511, 257, 258, 264/46.8, 510, 571, 321

[56] References Cited

U.S. PATENT DOCUMENTS

| | | | |
|---|---|---|---|
| 3,344,007 | 9/1967 | Skoggard | 264/511 |
| 3,490,978 | 1/1970 | Shockey et al. | 264/331.19 |
| 4,267,147 | 5/1981 | Pogoda et al. | 264/571 |
| 4,359,437 | 11/1982 | le Comte | 264/102 |
| 4,476,075 | 10/1984 | Brinkmann et al. | 264/245 |
| 4,483,669 | 11/1984 | Hahn et al. | 264/171 |
| 4,660,498 | 4/1987 | Madison | 264/511 |
| 5,023,042 | 6/1991 | Efferding | 264/571 |

FOREIGN PATENT DOCUMENTS 1263013  10/1989  Japan ..................................... 264/511

*Primary Examiner*—Robert A. Dawson
*Assistant Examiner*—Allan R. Kuhns
*Attorney, Agent, or Firm*—Griffin Branigan & Butler

[57] ABSTRACT

A method of manufacturing a large-sized, thin-walled object of fiber reinforced synthetic resin, using inner and outer mold parts, which bound a mold cavity. A reduced pressure is created in the cavity by means of at least one vent in one of the two mold parts communicating with a vacuum source. A hardenable resin is supplied to the cavity via one or more openings in at least one of the two mold parts. The inner mold part is form retaining. A first reinforcement fiber layer is applied to the inner mold part, and then at least one foam core extending in a longitudinal direcetion and having at least one supply duct provided in it is placed on the first reinforcement layer. A second reinforcement layer is placed over the foam core, followed by applying to the second layer foam strips in which a passageway is provided. The whole arrangement is then covered with a flexible outer mold part at whose circumference a plurality of vents are provided for communication with a vacuum source. Liquid resin is supplied to the cavity at the supply ducts in the foam core and flows through the passageways of the foam strips.

8 Claims, 2 Drawing Sheets

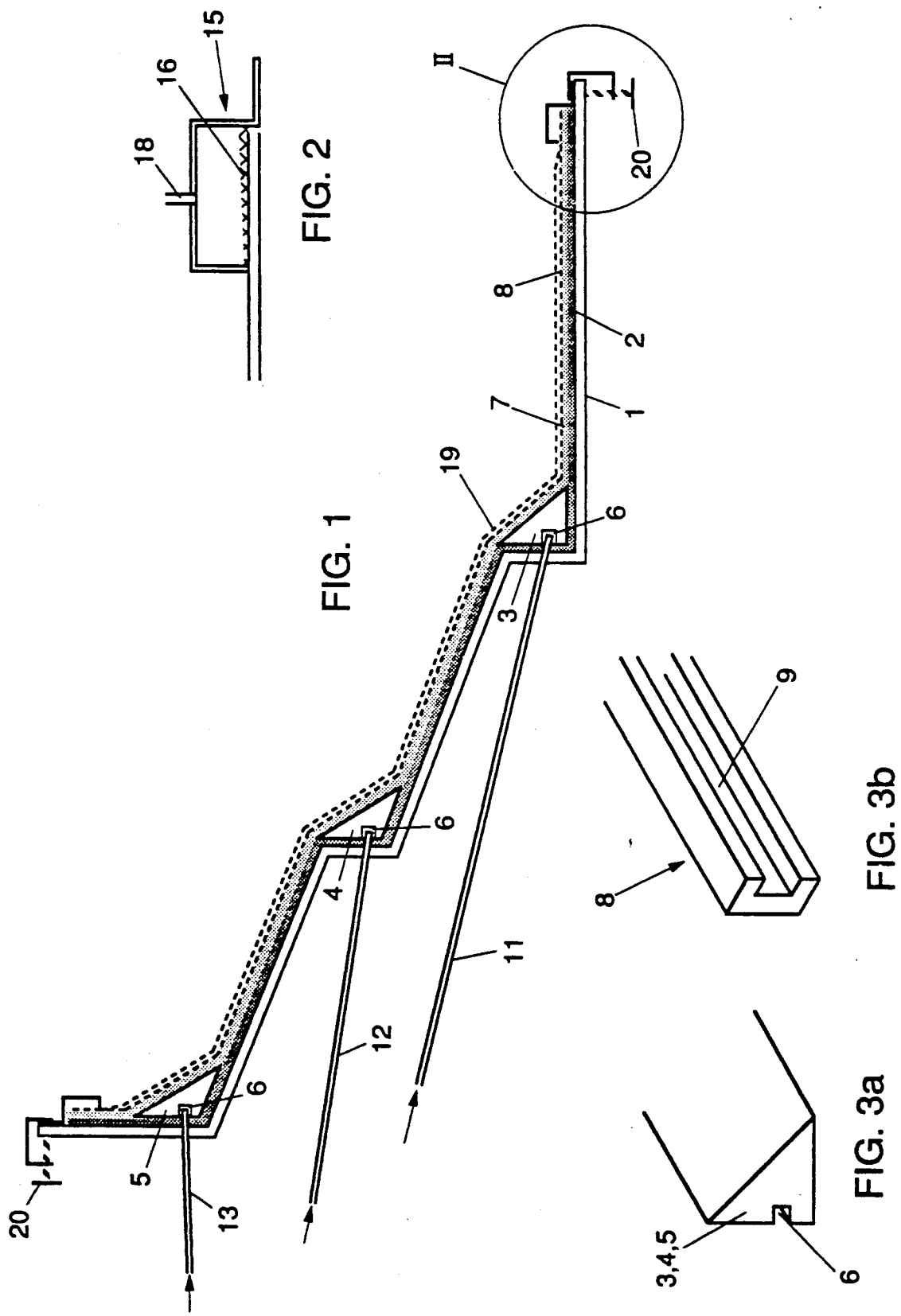

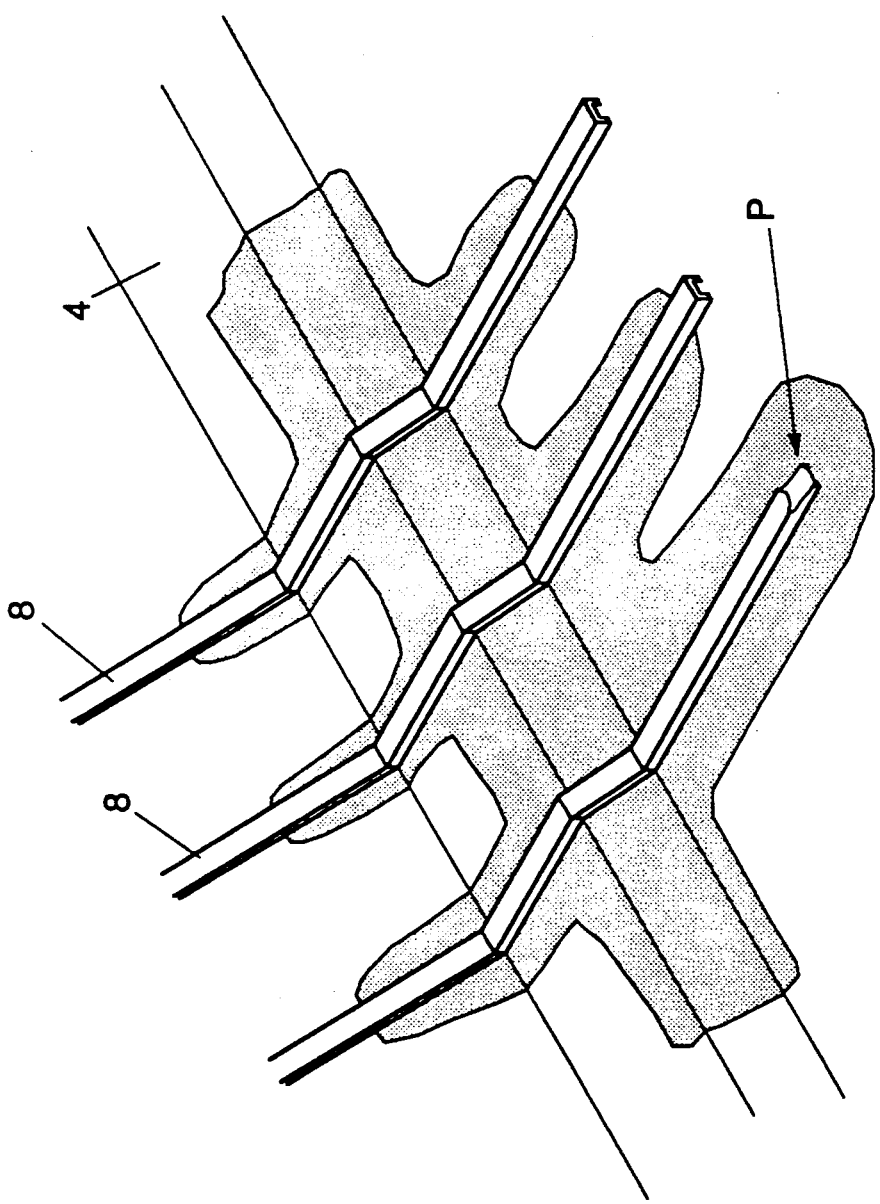

METHOD FOR MANUFACTURING AN OBJECT OF SYNTHETIC RESIN

BACKGROUND OF THE INVENTION

The invention relates to a method of manufacturing a large-sized, thin-walled object of fiber reinforced synthetic resin using inner and outer mold parts which bound a cavity for forming the aforementioned thin-walled object, in which a reduced pressure is created in the cavity by means of at least one vent in one of the two mold parts, which vent communicates with a vacuum source, and then flowing a hardening synthetic resin into the cavity via one or more openings in at least one of the two mold parts.

Such a method is known from applicant's Dutch patent specification 178,761 and the corresponding U.S. patent specification 4,359,437.

The disadvantage of this method is that in addition to a form-retaining inner mold part, a flexible, form-retaining outer mold part is also required. This means that, for forming large objects of different dimensions, different mold parts are required.

The invention overcomes the aforementioned disadvantage.

BRIEF SUMMARY OF THE INVENTION

To this effect, the method according to the invention is characterized by using a form-retaining inner mold part, to which a layer of reinforcement fibers is applied. At least one foam core extends in the longitudinal direction of the large-sized, thin-walled object and at least one supply duct is provided in the foamed core. A second layer of reinforcement fibers is provided, followed by applying to said second layer of reinforcement fibers a plurality of foam strips in which a passageway is provided. That whole arrangement is then covered with a flexible outer mold part at whose circumference a plurality of vents are provided which communicate with a vacuum source. Liquid resin is supplied to the mold cavity via one or more supply ducts extending in the mold cavity in the longitudinal direction of the object being molded. Thus, it is sufficient to use a flexible, non-preformed outer mold part, such as a flexible foil, and, furthermore, one may optionally use as an inner mold part a movable part, possibly prefabricated of separate parts. This means it is possible to manufacture the object in a considerably cheaper way.

In a further elaboration of the invention, the liquid resin may be drawn from a storage tank.

The reinforcement fibers may be aramid, Kevlar, glass or carbon fibers or the like.

The invention further relates to an apparatus for carrying out the method described, which apparatus is characterized in that the air extraction is effected from the mold cavity by means of a hollow "beam or tube" extending around the object and the side of which that is proximal to the mold cavity is covered by a mesh material and the side of which that is remote from the mold cavity is connected to a vacuum source. Thus, it is ensured that, when a vacuum is created in the mold cavity, the flexible outer mold part, e.g. a foil, will not close air extraction passages, which would render it essentially impossible to create a vacuum in the mold cavity.

To elucidate the invention, one embodiment of a method of manufacturing a part of a ship will now be described with reference to the accompanying drawings.

BRIEF DESCRIPTION OF THE DRAWINGS

FIG. 1 shows a schematic cross-section of one half of a ship hull manufactured by the method according to the invention;

FIG. 2 shows a detail II of the apparatus according to FIG. 1 on an enlarged scale;

FIG. 3 shows a perspective view of the foam core (FIG. 3a) and the foam strip (FIG. 3b) used in the method according to FIGS. 1 and 2; and FIG. 4 shows a perspective view of an application of the apparatus according to FIGS. 1-3 on an enlarged scale.

DETAILED DESCRIPTION OF THE INVENTION

According to the drawing, for manufacturing a large-sized, thin-walled object, such as the hull of a ship, of which one half is shown in FIG. 1, a form-retaining inner mold part 1 is used. To this mold part 1, a layer of reinforcement fibers 2 is applied. In the present case, three foam cores 3, 4, 5 are applied to reinforcement layer 2, but it will be clear that a different number of cores may be provided (depending on the size and/or the form of the object to be manufactured). In each foam core 3, 4, 5, a supply duct 6 is provided. Onto the assembly thus formed, a second reinforcement layer 7 is applied, and onto layer 7, a plurality of foam strips 8 are then applied. The foam strips 8 extend transversely to the foam cores (see also FIG. 4), and on the side proximal to the reinforcement layers 2 and 7, the foam strips have passageways 9 for allowing air to be more readily extracted from the mold cavity and the liquid resin to more readily fill the mold cavity. It will be clear that the aforementioned foam cores 3, 4 and 5 may also serve as longitudinal support ribs for the ship hull.

As schematically shown in the drawing, the supply ducts 6 provided in the foam cores 3, 4, 5 are connected with a storage tank of fluid resin (not shown) via schematically shown conduits 11, 12 and 13. Onto the outer second reinforcement layer 7 and the foam strips 8 applied thereto, a flexible outer mold part 19, in the form of a flexible foil, is arranged. The various layers within the mold cavity are interconnected and sealed at sealing edges in a simple manner by means of a plurality of clamps 20. Inwards relatively to the sealing edges thus formed, around the object being molded, a hollow beam or tube 15 is provided (see FIG. 2), whose side proximal to the mold cavity is covered by a mesh material 16, and the opposite side of the beam or tube 15 is connected to a plurality of air extraction channels or stubs 18 communicating with a vacuum source. It will be clear that the construction is such that a plurality of hollow beams or tubes, each communicating with the mold cavity to be evacuated, may be provided, and each having a corresponding opening in the outer mold part or the tube being mounted outside of the outer mold part.

FIG. 4, finally, shows a perspective view on an enlarged scale of an application of the apparatus according to FIGS. 1-3 during the manufacture of a large object. It is schematically indicated here that the passageway of one of the foam strips 8 is closed tight by pressing at the end thereof (indicated with arrow P). This closing will be made when the mold cavity is filled completely at the end of the subject foam strip 8.

Because the method according to the invention is concerned with a closed system, an important further advantage is obtained in that the styrene, a component of a commonly used synthetic resin (and may represent a health hazard), will hardly, if at all, be released during the process, which renders the method according to the invention very friendly to the environment.

It will be clear that a large number of modifications will occur to a skilled person without departure from the principle of the invention.

What I claim is:

1. In a method of manufacturing a large-sized, thin-walled, elongated object of fiber reinforced synthetic resin wherein a form-retaining, rigid inner mold part and a form-retaining, flexible outer mold part define a mold cavity therebetween, a reduced pressure is induced in the mold cavity by means of at least one vent in one of said mold parts being connected to a vacuum source, and a hardenable synthetic resin is supplied to the mold cavity containing fiber reinforcement by way of one or more openings in at least one of the mold parts, the improvement comprising:
   (1) applying at least a first fiber reinforcing layer to the form-retaining, rigid inner mold part such that the first reinforcing layer is substantially co-extensive with the inner mold part;
   (2) applying at least one elongated core to the said first reinforcing layer, with said core extending in the longitudinal direction of the object to be molded and wherein the core has at least one resin supply duct therein extending in the longitudinal direction of the core;
   (3) applying at least a second fiber reinforcing layer at least over the core and such that the second reinforcing layer is substantially co-extensive with the first reinforcing layer;
   (4) covering the assembly provided by steps (1) through (3) with a non-form-retaining, flexible outer mold part such that the flexible mold part forms a circumferential juncture with the inner mold part and a plurality of circumferential vents are provided at said juncture;
   (5) connecting the circumferential vents to a vacuum source so as to pull and hold said non-form-retaining, flexible outer mold part against the assembly of steps (1) through (4); and
   (6) supplying hardenable synthetic resin to said resin supply duct;
   and wherein said supplied resin flows through said resin supply duct of the core and into said reinforcing layers under the influence of the vacuum created in the mold cavity.

2. In a method of manufacturing a large-sized, thin-walled, elongated object of fiber reinforced synthetic resin wherein a form-retaining, rigid inner mold part and a form-retaining, flexible outer mold part define a mold cavity therebetween, a reduced pressure is induced in the mold cavity by means of at least one vent in one of said mold parts being connected to a vacuum source, and a hardenable synthetic resin is supplied to the mold cavity containing fiber reinforcement by way of one or more openings in at least one of the mold parts, the improvement comprising:
   (1) applying at least a first fiber reinforcing layer to the form-retaining, rigid inner mold part such that the first reinforcing layer is substantially co-extensive with the inner mold part;
   (2) applying at least one core to the said first reinforcing layer, with said core extending in the longitudinal direction of the object to be molded and wherein the core has at least one resin supply duct therein extending in the longitudinal direction of the core;
   (3) applying at least a second fiber reinforcing layer at least over the core and such that the second reinforcing layer is substantially co-extensive with the first reinforcing layer;
   (4) applying a plurality of strips having longitudinal passageways therein over the second reinforcing layer in a direction substantially transverse to the direction of the core, with said strips extending toward edges of said reinforcing layers;
   (5) covering the assembly provided by steps (1) through (4) with a non-form-retaining, flexible outer mold part such that the flexible mold part forms a circumferential juncture with the inner mold part and a plurality of circumferential vents are provided at such juncture;
   (6) connecting the circumferential vents to a vacuum source so as to pull and hold said non-form-retaining, flexible outer mold part against the assembly of steps (1) through (5); and
   (7) supplying hardenable synthetic resin to said resin supply duct;
   and wherein said supplied resin flows through said resin supply duct of the core, through said passageways of the strips and into said reinforcing layers under the influence of the vacuum created in the mold cavity.

3. A method according to claim 1 wherein the core is a foamed core.

4. A method according to claim 2 wherein the core is a foamed core.

5. A method according to claim 4 wherein the strips are foamed strips.

6. A method according to claim 5 wherein when the resin has reached the vicinity of the end of a passageway in a foam strip, said passageway is closed tight by pressing the end thereof.

7. A method according to claim 5, wherein the liquid resin is drawn from a storage tank.

8. A method according to claim 5, wherein the reinforcement fibers are selected from the group consisting of aramid, glass and carbon fibers.

* * * * *